(12) United States Patent
Kidwell et al.

(10) Patent No.: US 8,728,197 B2
(45) Date of Patent: May 20, 2014

(54) METAL NANOPARTICLES WITH A PRE-SELECTED NUMBER OF ATOMS

(75) Inventors: David A. Kidwell, Alexandria, VA (US); Albert Epshteyn, College Park, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 329 days.

(21) Appl. No.: 13/323,287

(22) Filed: Dec. 12, 2011

(65) Prior Publication Data

US 2012/0144956 A1 Jun. 14, 2012

Related U.S. Application Data

(60) Provisional application No. 61/422,526, filed on Dec. 13, 2010.

(51) Int. Cl.
*B22F 9/18* (2006.01)
*C08K 3/10* (2006.01)

(52) U.S. Cl.
USPC ............... 75/343; 75/370; 524/239; 524/398; 524/399; 524/556; 977/754; 977/783; 977/895

(58) Field of Classification Search
None
See application file for complete search history.

(56) References Cited

U.S. PATENT DOCUMENTS

| 2004/0058006 | A1* | 3/2004 | Barry et al. ................ 424/489 |
| 2008/0118912 | A1 | 5/2008 | Dickson et al. |
| 2010/0278750 | A1 | 11/2010 | Krippner et al. |

OTHER PUBLICATIONS

Zheng, Z. et al., "Monodisperse noble metal nanoparticles stabilized in SBA-15: Synthesis, characterization and application in microwave-assisted Suzuki-Miyaura coupling reaction", Journal of Catalysis 270, pp. 268-274, Feb. 19, 2010.*
Benini et al., "Functionalization of PAMAM dendrimers with [RuIII(edta)(H2O)]", Nitric Oxide 19 (2008) 245-251.
Carenco et al., "Controlled Design of Size-Tunable Monodisperse Nickel Nanoparticles", Chem. Mater., 22 (2010) 1340-1349.
Davies et al., "Synthesis of Nα-Boc-Nε-tetrabenzyl-DTPA-L-lysine and Nα-Fmoc-Nε-tetra-t-butyl-DTPA-L-lysine, building blocks for solid phase synthesis of DTPA-containing peptides" J. Peptide Sci. 8: 663-670 (2002).
Gilbertson et al., "Air and Water Free Solid-Phase Synthesis of Thiol Stabilized Au Nanoparticles with Anchored, Recyclable Dendrimer Templates" Langmuir 2007, 23, 11239-11245.
Knecht et al., "Synthesis and Characterization of Pt Dendrimer-Encapsulated Nanoparticles: Effect of the Template on Nanoparticle Formation", Chem. Mater., 2008, 20 (16), 5218-5228.
Margerum, et al., "Gadolinium(III) DO3A macrocycles and polyethylene glycol coupled to dendrimers", J. Alloys and Compounds, 249 (1997) 185-190.
Ochi et al., "Phenylazomethine Dendrimers with Soft Aliphatic Units as Metal-Storage Nanocapsules and Their Self-Assembled Structures", European Journal Chemistry-A, 17 (2011) 800-809.
Petkov et al., "Periodicity and Atomic Ordering in Nanosized Particles of Crystals", J. Phys. Chem. C 2008, 112, 8907-8911.

(Continued)

*Primary Examiner* — George Wyszomierski
(74) *Attorney, Agent, or Firm* — US Naval Research Laboratory; Roy Roberts (57) ABSTRACT

A metron refers to a molecule which contains a pre-defined number of high affinity binding sites for metal ions. Metrons may be used to prepare homogenous populations of nanoparticles each composed of a same, specific number of atoms, wherein each particle has the same size ranging from 2 atoms to about ten nanometers.

18 Claims, 6 Drawing Sheets

(56) References Cited

OTHER PUBLICATIONS

Yamamoto, D. et al., "Coordination and Reduction Processes in the Synthesis of Dendrimer-Encapsulated Pt Nanoparticles", Langmuir 26 (2010) 2339-2345.

Yamamoto, K. et al., "Size specific catalytic activity of platinum clusters enhances oxygen reduction reactions", Nature Chemistry, 1 (2009) 397.

Wu et al., "One-pot synthesis of atomically monodisperse, thiol-functionalized Au25 nanoclusters", J. Mater. Chem., 19 (2009) 622-626.

Scott, Robert W. J. et al. "Synthesis, characterization and applications of dendrimer-encapsulated nnnoparticies." J. Phys. Chem. B. 2005, vol. 109, pp. 692-704.

Crooks. Richard M. et al. "Dendrimer-encapsulated metal nanoparticles: Synthesis, characterization, and applications to catalysis." Accounts of Chemical Research. Mar. 2001, vol. 34, No. 3, pp. 181-190.

International Search Report and Written Opinion mailed Sep. 3, 2012 in PCT/US2011/064399.

Yantasee et al. "Electrophilic Aromatic Substitutions of Amine and Sulfonate onto Fine-Grained Activated Carbon for Aqueous-Phase Metal Ion Removal." Separation Science and Technology, vol. 39, No. 14, pp. 3263-3279, 2004.

Kulczynska et al., "Effect of PAMAM Dendrimer Size and pH on the Electrostatic Binding of Metal Complexes Using Cyclic Voltammetry," Macromolecules 2006, 39, 7372-7377.

* cited by examiner

METAL NANOPARTICLES WITH A PRE-SELECTED NUMBER OF ATOMS

CROSS-REFERENCE TO RELATED APPLICATIONS

This Application claims the benefit of U.S. Provisional Application 61/422,526 filed on Dec. 13, 2010, the entirety of which is incorporated herein by reference.

BACKGROUND

The catalytic properties of metals have been shown to vary with particle size. Metallic particles in the 1-5 nm range (essentially bulk metals) are traditionally prepared by reduction methods that produce a size distribution within each batch; meaning that the particle sizes within a population (or batch) can vary greatly. See, e.g., Sophie Carenco, Cedric Boissiere, Lionel Nicole, Clement Sanchez, Pascal Le Floch, and Nicolas Mezailles, "Controlled Design of Size-Tunable Monodisperse Nickel Nanoparticles", Chem. Mater., 22 (2010) 1340-1349.

A relatively unexplored concept is the study of the properties of metal clusters/nanoparticles as the particles increase in size from a small number of atoms to larger particles that generally have the properties of bulk metallic solids. For example, in the case of gold (Au), bulkier particles of 50 nm and larger are conductive, non-catalytic, and non-toxic, but in the range of 5 to 10 nm the material becomes conductive, and at sizes less than 5 nm become insulating (in the case of $Au_{32}$), fluorescent, toxic ($Au_{55}$), and catalytic. Thus, when operating in the size regime of 1 nm and smaller, differences of a single atom may produce significant differences in the properties of each particle. This window or range is from metallic clusters to about 1 nm particles, or 2-100 atoms (for palladium, 50 atoms form a cube 0.9 nm on a side whereas 150 atoms form a 1.3 nm cube) where control of the number of atoms by direct synthesis is difficult yet the size is small enough where one can expect to see substantial chemical differences upon adding or subtracting even one atom. To date, there has been no general tool to prepare macroscopic amounts of small metallic clusters with an arbitrary, pre-selected number of atoms.

Smaller metallic clusters (tens of atoms) are amenable to direct synthesis and have been detected, however with the exceptions of certain "magic-number clusters" they are difficult to prepare in bulk and thus have not been isolated in macroscopic quantities, and accordingly have not been well characterized. See Zhikun Wu, Joseph Suhan, and Rongchao Jin, "One-pot synthesis of atomically monodisperse, thiol-functionalized $Au_{25}$ nanoclusters," J. Mater. Chem., 19 (2009) 622-626.

"Magic-number clusters" refer to certain very particular forms of atomically defined nanoparticles that can be prepared by virtue of their inherent chemistry, such $Au_{25}$ and $Au_{55}$ as well as $C_{60}$ and $C_{70}$, and can be distinguished from the "atomic metrons" described herein which permit arbitrary design of atomically-defined nanoparticles. With a magic-number cluster, one must accept the atomic composition imposed by nature.

Monodisperse "magic-number cluster" nanoparticles have been prepared and studied in the gas phase. Richard E. Smalley received the Nobel Prize in 1996 for $C_{60}$ discovered by this procedure, however it is still a very complex procedure to make and requires substantial purification to isolate $C_{60}$ and $C_{70}$ from other soot components. For example, M. E. Geusic, M. D. Morse, and R. E. Smalley, "Hydrogen chemisorption on transition metal clusters", J. Chem. Phys. 82 (1985) 5218-5228. Metal clusters of cobalt and niobium were prepared by bombarding metal surfaces with a laser and expanding the resultant clusters into a vacuum. The clusters were size-selected from the distribution formed and reacted through collisions in the gas phase with hydrogen. The authors showed selective reaction for different sizes, sometimes exhibiting great reactivity differences with only one additional atom. This approach is well known in the art, but you are essentially selecting the clusters one at a time and disposing of the vast number of clusters that do not meet the size criteria. This approach is not very material efficient. The clusters can be landed on a surface and isolated in detectable amounts but not macroscopic amounts by this technique without heroic effort and they do not necessarily retain their original atomic number.

A dendrimer is a repetitively branched molecule, so that the number of functional groups present in a dendrimer is limited to particular integers, increasing by powers of 2. One example of a dendrimer is poly(amidoamine). Dendrimers have been used to bind metal ions, but previously have not been used for the synthesis of homogenous populations of nanoparticles each composed of the same, specific number of atoms.

A group including Richard Crooks published on the use of dendrimers as templates for nanoparticle formation. See Marc R. Knecht, Michael G. Weir, V. Sue Myers, William D. Pyrz, Heechang Ye, Valeri Petkov, Douglas J. Buttrey, Anatoly I. Frenkel, and Richard M. Crooks, "Synthesis and Characterization of Pt Dendrimer-Encapsulated Nanoparticles: Effect of the Template on Nanoparticle Formation", Chem. Mater., 2008, 20 (16), 5218-5228 and Valeri Petkov, Nick Bedford, Marc R. Knecht, Michael G. Weir, Richard M. Crooks, Wenjie Tang, Graeme Henkelman, and Anatoly Frenkel, "Periodicity and Atomic Ordering in Nanosized Particles of Crystals", J. Phys. Chem. C 2008, 112, 8907-8911. They used dendrimers as templates and varies the number of metal ions that they contained by varying the ratio of metal ions to dendrimer. However, none of these dendrimers are decorated with metal binding sites of strong affinity ($K_d > 10^{10}$) so that the dendrimers cannot measure-out the appropriate numbers of metal atoms, and thus the resultant nanoparticles include a relatively broad distribution of sizes.

Researchers in Japan have described the preparation of a coordinating dendrimer with binding sites for platinum in a step-wise fashion, as seen in Kimihisa Yamamoto, Takane Imaoka, Wang-Jae Chun, Osamu Enoki, Hideaki Katoh, Masahiro Takenaga, and Atsunori Sonoi, "Size specific catalytic activity of platinum clusters enhances oxygen reduction reactions", Nature Chemistry, 1 (2009) 397; Daigo Yamamoto, Satoshi Watanabe, and Minoru T. Miyahara, "Coordination and Reduction Processes in the Synthesis of Dendrimer-Encapsulated Pt Nanoparticles", Langmuir 26 (2010) 2339-2345; and Yousuke Ochi, Kozue Sakurai, Keisuke Azuma, and Kimihisa Yamamoto, "Phenylazomethine Dendrimers with Soft Aliphatic Units as Metal-Storage Nanocapsules and Their Self-Assembled Structures", European Journal Chemistry-A, 17 (2011) 800-809. However, the approach taken was to fill the binding sites by controlling the ratio of platinum to the dendrimer. The binding is different for different parts of the dendrimer so that different "layers" are filled depending on the ratio of platinum to dendrimer. No purification nor removal of excess metal ions were done, likely because the binding was too weak and ions would be undesirably extracted.

As described in P. G. Z. Benini, B. R. McGarvey, and D. W. Franco, "Functionalization of PAMAM dendrimers with [RuIII(EDTA)($H_2O$)]", Nitric Oxide 19 (2008) 245-251, preformed Ru (EDTA) was bound to a commercially-available poly(amidoamine) dendrimers using carbodiimide chemistry. This group used chemistry that showed that an EDTA metal chelate could be attached to dendrimers. The complex was not purified. It was used for nitrous oxide reduction studies and was not reduced to a nanoparticle.

One group has attached an isothiocynate chelator to an amine terminated dendrimer and bound it to $Gd^{+3}$, as disclosed in L. D. Margerum, B. K. Campion, M. Koo, N. Shargill, J. LAI, A. Marumoto, and P. C. Sontum, "Gadolinium(III) DO3A macrocycles and polyethylene glycol coupled to dendrimers: effect of molecular weight on physical and biological properties of macromolecular magnetic resonance imaging contrast agents", J. Alloy. Compd., 249 (1997) 185-190. After binding the gadolinium, the material was dialyzed to remove free Gd. The resultant molecules were not purified nor were single entities as evidenced by FAB-MS. The chelated dendrimer carrier was used for in vivo studies as an NMR contrast agent. No nanoparticles were produced.

A need exists for a technique to select specific numbers of atoms per nanoparticle so that macroscopic batches of nanoparticles can be obtained.

BRIEF SUMMARY

In one embodiment, a method of preparing atomically defined nanoparticles comprises providing metrons, filling the metrons with metal ions to obtain a filled metron, removing excess metal ions, spatially isolating the filled metrons, and reducing the metal ions to obtain a atomically defined nanoparticles.

In another embodiment, a method of preparing a metron comprises sequential synthesis to obtain a metron is configured to contain a particular number of metal atoms between 2 and 1000.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a," "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

As used herein, the term "metal ion" refers to both simple and complex metal ions and includes defined clusters of ions, such as those having multiple elements or multiple atoms of a given element in a defined compound. In various embodiments, a metal ion includes no more than 100, 90, 80, 70, 60, 50, 40, 30, 20, 19, 18, 17, 16, 15, 14, 13, 11, 10, 9, 8, 7, 6, 5, 4, 3, or 2 atoms, or a single atom.

As used herein, the term "sequential synthesis" refers to a synthetic process wherein two or more different reactions are performed sequentially, thus linking molecules together into a polymer such that each reaction step places a known number of entities on the polymer, and includes solid phase and solution phase synthesis.

As used herein, the term "metron" refers to a molecule comprising a pre-selected number of between 2 and 1000 of high affinity, meaning $K_d > 10^{10}$, binding sites for metal ions.

As used herein, the term "atomically defined nanoparticles" refers to an essentially homogenous population of nanoparticles each composed of a pre-selected number and type of atoms, wherein each particle has the same size ranging from 2 atoms to about ten nanometers. Most preferably, the atomically defined nanoparticles are 100% pure (as far as ascertainable in view of the limits of the detection technique used), in that all the nanoparticles in the population have the same composition and number of atoms. Less preferably, the population may have a purity of at least 99.99%, 99.9%, 99.5%, 99%, 98%, 97%, 96%, 95%, 94%, 93%, 92%, 91%, 90%, 89%, 88%, 87%, 86%, 85%, 94%, 83%, 82%, 81%, or 80%.

Description

The metron (sometimes called an "atomic metron") described herein has a particular number of high affinity, ($K_d > 10^{10}$) binding sites, which enable it to bind exactly that number of metal ions. This allows the metron to be used as a tool to select the number of metal atoms that will be included in each separate nanoparticle in a given batch of prepared nanoparticles. The word "metron" is derived from the Greek noun "μέτρον" referring to a measure (quantity), such as a measure of wheat.

Typically, the number of atoms is between 2 and 1000, and is pre-determined as desired by selecting an appropriate atomic metron to bind that particular number of atoms. The fidelity of the number of atoms in a resultant population of nanoparticles is dependent on the purity of the atomic metrons used. If the atomic metron is at a near 100% purity, with a completely homogeneous population of identical metrons, then the batch of nanoparticles prepared using these metrons will have a corresponding nearly 100% homogeneous population with all nanoparticles containing exactly the same number of atoms as there were binding sites on the metron.

An example of a metron is a macromolecule, such as a dendrimer, with a pre-defined number of chelator-derivatized binding sites of high affinity toward metal ions. One could also use a synthetically prepared poly-lysine peptide with a pre-defined number of lysines bound in a chain, similar to beads in a necklace, and modify each lysine with a chelator. Another way would be to use solid-phase synthesis and link individual chelator molecules into a chain, as with sequential synthesis. What is desired is a molecule with a predefined number of binding sites, where, in a given batch of molecules, all the molecules are identical and have exactly the same number of binding sites.

Once atomic metrons are obtained, it is possible to load metal ions into the metrons by chelation, and because of the strong binding of the metal ions, later remove excess metal ions by purification, thus obtaining filled metrons. The removing is done while substantially retaining the metal ions bound to the metrons. This can be done by purification techniques such as chromatography, dialysis, recrystalization, electrophoresis, and the like, and combinations thereof. The metron may be subjected to such purification techniques at any stage.

The filled metrons are then spatially isolated from each other in some manner such as encapsulation into an isolation matrix, dilution in solution, or attachment on a column, and the metal ions are converted to a nanoparticle and/or the metron is removed by heat or combustion.

Mixed metal nanoparticles (i.e., comprising at least two different metals) can be formed with the use an atomic metron. Two ways this may be accomplished are: (1) the metron can have one or more metal ions pre-bound during synthesis, while also including empty binding sites available to bind another metal ion; and (2) the metron may have binding sites with differing affinities to different metal ions to allow selection of the metal ions from a mixed solution.

Metrons can also be used with small clusters of metal atoms, such as iron-sulfur clusters including but not limited to $Fe_3S_2(CO)_9$, $[Fe_3S(CO)_9]^{2-}$, $(C_5H_5)_4Fe_4S_4$, and $[Fe_4S_4Cl_4]^{2-}$. Some such clusters will bind an appropriate metron just would other metal ions, so that a metron may be filled with the clusters. Alternately, one or more atomic clusters could be covalently attached to a metron during sequential synthesis of the metron (discussed below), thus leaving the possibility for the metron to later bind other metal ions in addition to the cluster.

Optionally, in addition to including a pre-selected number of high affinity binding sites for metal ions, a metron may be designed with a chemical attachment point for further manipulation. For example, such an attachment could facilitate the binding of two or more metrons together, or the binding of a metron to a surface. A metron may be prepared by convergent synthesis wherein various metrons comprising the same or different metal ions are bound together to form a larger metron that can be isolated and purified. This combined metron can allow preparation of metal nanoparticles containing a predefined number of different metals. If the same ions are used in the starting metrons, convergent synthesis can build a metron of a large number of atoms.

The various techniques for preparing and manipulating metrons may be combined.

Filled metrons can be kept separated from each other in an isolation matrix. An "isolation matrix" is a solid matrix medium that provides a barrier preventing the particles from moving while allowing small molecules to permeate, thus allowing reactants and products to interact with the nanoparticles.

Figure 1:
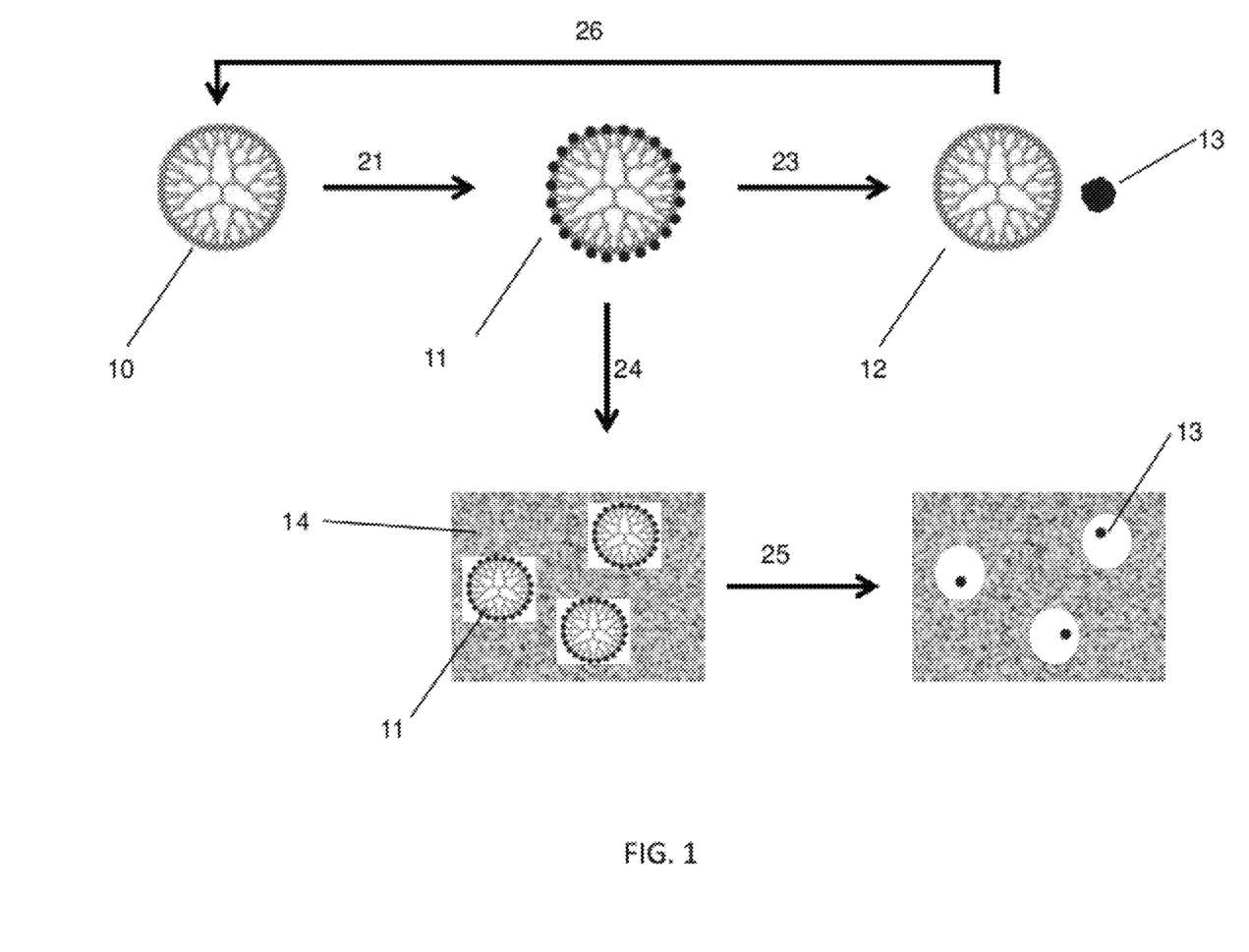
FIG. 1 illustrates an exemplary scheme for obtaining a nanoparticle comprising a pre-defined number of atoms.

FIG. 1 illustrates an exemplary scheme for obtaining a nanoparticle comprising a pre-defined number of atoms. This example starts with a commercially available amine terminated dendrimer (a repetitively branched molecule) that has been derivatized with binding elements such as diethylene triamine pentaacetic acid (DTPA) and/or ethylenediaminetetraacetic acid (EDTA) and/or derivatives thereof such as ethylene glycol tetraacetic acid, forming a metron 10. Suitable starting dendrimers are available from, e.g., Dendritic Nanotechnologies, Inc.

In the exemplary method of FIG. 1, the metron 10 is filled 21 with metal ions to form a filled metron 11. Alternately, the metron can be synthesized in a pre-filled or partially-filled state. At this point, the filled metron 11 may either be isolated 24 in an isolation matrix 14 (such as silica) or purified using other techniques such as column chromatography, electrophoresis, dialysis, and combinations thereof. (see, e.g., Gilbertson et al., "Air and water free solid-phase synthesis of thiol stabilized Au nanoparticles with anchored-recyclable dendrimer templates," Langmuir (2007), 23, 11239-11245), followed by reducing the metal ions 23. In any event, the is important to keep the metron filled with metal ions. In the case of using an isolation matrix, the matrix may be removed 25 by heat or combustion. Being spatially constrained, the metal ions would coalesce into nanoparticles comprising a pre-defined number of atoms 13. Heat or combustion would likely leave the metal ions as oxides or carbides, depending on the metal. These can be further treated (reduced) to make metal nanoparticles by conventional means, such as hydrogenation or left in that form. In the situation when the filled metrons are in a permeable isolation matrix, the metal therein may be reduced to obtain the nanoparticles comprising a pre-defined number of atoms. If the metrons are not destroyed by heat or combustion, the metrons may optionally be re-used 26.

The atomic metron can be made reusable by binding to a column, if the particles are thermodynamically stable when formed. Once the atomic metron is filled, the particles would be formed by reduction and eluted from the column. A reusable column allows rapid synthesis of the particles (and of the bucket if you use the column as the support for growing the biomolecule atomic metron). A possible downside of the column method is that the particles may coalesce if not ligand stabilized (by organic ligands for example), and the ligand systems may have to be developed separately for each type of particle produced.

EXAMPLES

The general approach depicted in FIG. 1 has been verified in preliminary experiments with palladium in a solution-based procedure. Approximately 1 nm particles, as measured by transmission electron microscopy, were produced using diethylenetriamine pentaacetic dianhydride (DEPAA) derivatized dendrimers.

A "G4" dendrimer (referring to a "fourth generation" dendrimer having 48 surface groups) was derivatized with DPTA anhydride in the solvent DMF. It was then dialyzed and $Pd^{2+}$ introduced. It was then dialyzed, followed by reduction with $NaBH_3CN$ in solution without ligands.

Figure 2:
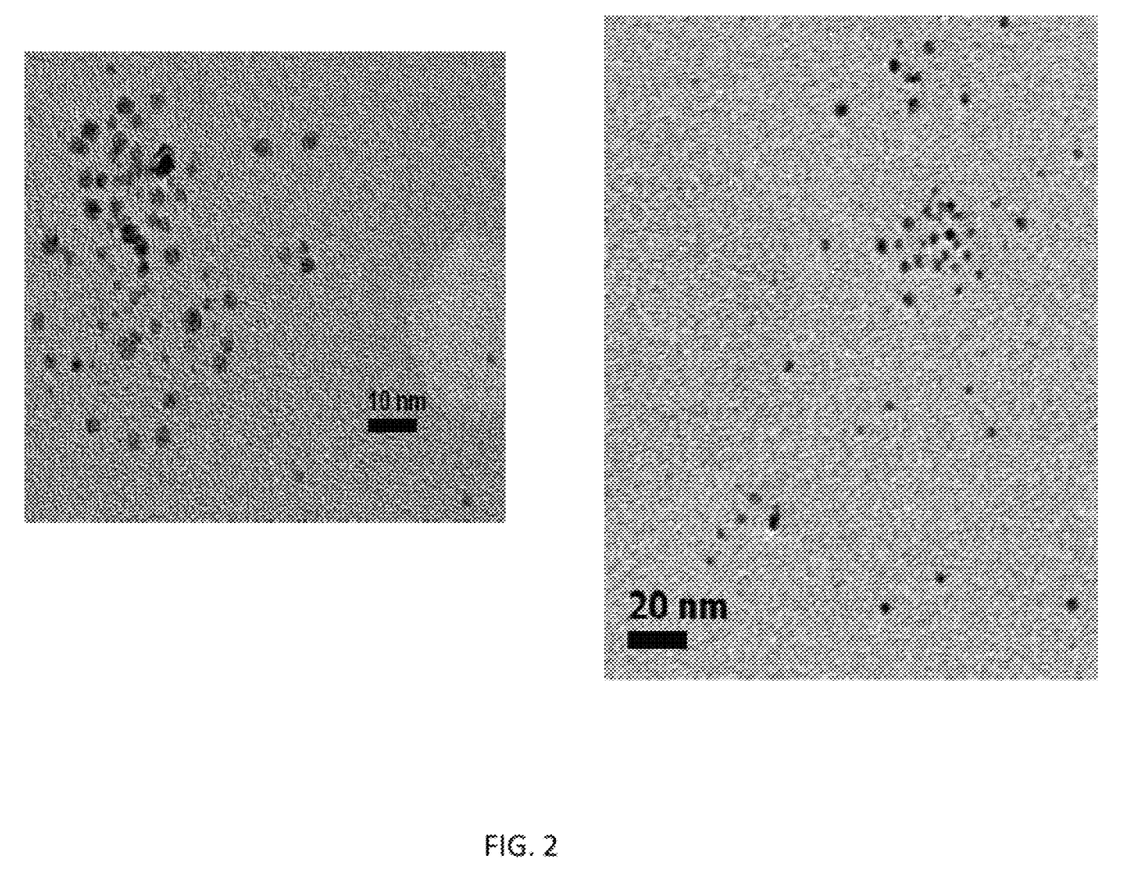
FIG. 2 shows transmission electron micrograph (TEM) images of nanoparticles prepared as described herein.

FIG. 2 shows transmission electron micrograph (TEM) images of the purified nanoparticles. Some aggregation of nanoparticles can be seen, with smaller nanoparticle on the outside of the clusters.

Figure 3:
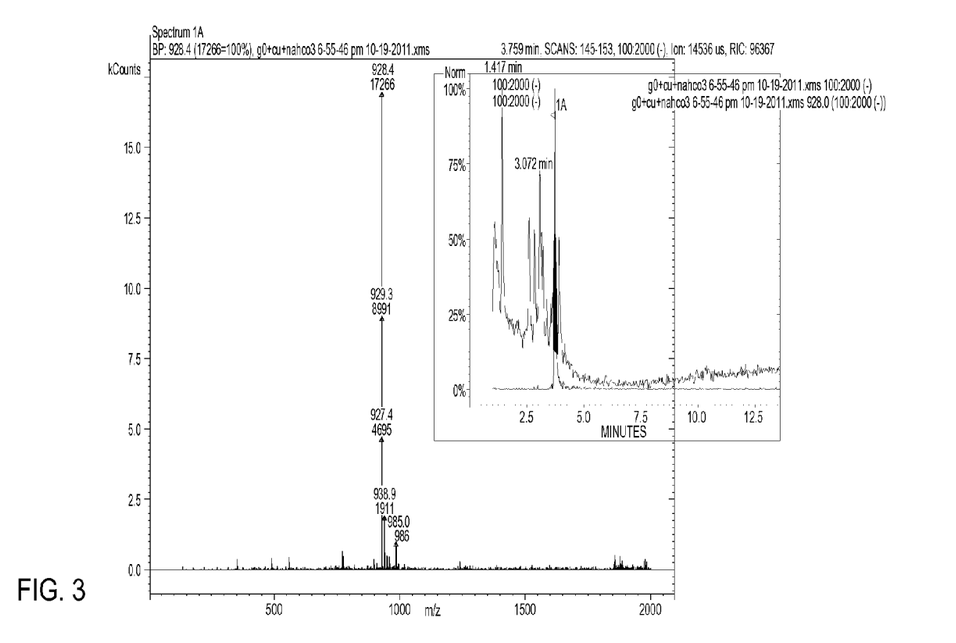
FIG. 3 shows the results of electrospray-liquid chromatography mass spectrometry (ES-LC/MS) analysis of purified nanoparticles prepared as described herein.

Similarly, Cu4@4AM (referring to four copper atoms attached to a single metron having four binding sites) nanoparticles were prepared. The nanoparticles were analyzed by electrospray-liquid chromatography mass spectrometry (ES-LCMS), as seen in FIG. 3.

Relationship of Purity to Binding Constant and Metron Size

Assuming that the binding sites in the metron are independent (i.e. binding at one site does not influence the binding constant at a nearby site), the effective binding constant of the entire metron depends exponentially on the number of individual binding sites therein. For example, for 99% of a population of metrons to have all their n binding sites filled, the constant is related to the $n^{th}$ root of 0.99, so that for a metron with 32 binding sites, $n=32 \rightarrow \approx 0.999686$ average binding at each site. The effective binding constant for metron is $K_d=$ [Metron]/([Metron]*(1−x))$^2$, where x is the average binding at each site.

For a solution of the metron at 1 mM, $K_d$=0.001/(0.001* (1−0.999686))^2≈10$^{10}$. Other values are in Table 1. The higher the binding constant, the more filled each site would be on the metron. The binding constant necessary to fill each site is indirectly related to the solution concentration or the metron. For example, to maintain the same metron purity upon decreasing the metron solution concentration from 1 mM to 0.1 mM, one would need to increase the binding constant by a factor of 10.

TABLE 1

Approximate binding constants for a 1 mM solution of a Metron

| Metron Size | Purity | Binding Constant |
|---|---|---|
| 10 | 99% | 9.910E+08 |
| 20 | 99% | 3.962E+09 |
| 30 | 99% | 8.913E+09 |
| 40 | 99% | 1.584E+10 |
| 50 | 99% | 2.476E+10 |
| 60 | 99% | 3.565E+10 |
| 70 | 99% | 4.852E+10 |
| 80 | 99% | 6.337E+10 |
| 10 | 95% | 3.820E+07 |
| 20 | 95% | 1.524E+08 |
| 30 | 95% | 3.427E+08 |
| 40 | 95% | 6.089E+08 |
| 50 | 95% | 9.512E+08 |
| 60 | 95% | 1.369E+09 |
| 70 | 95% | 1.864E+09 |
| 80 | 95% | 2.434E+09 |

Sequential Synthesis of Metrons

Dendrimers are normally made through Michael addition. However, the reaction is reversible in base and can result in loss of side-chains, resulting in a heterogeneous population. As a result, metrons made from these dendrimers may not have the desired complement of binding sites. Moreover, as noted above, because a dendrimer is a repetitively branched molecule, the number of functional groups therein is limited to particular integers, increasing by powers of two. Furthermore, addition of anhydrides to dendrimers (as might be done for functionalization with groups to bind metal ions) may cause undesired crosslinking and loss of binding sites. Sequential synthesis may serve to overcome these issues.

Sequential synthesis refers to a synthetic process wherein two different reactions are performed to link molecules together into a polymer in a sequential fashion such that each step places a known number of entities on the polymer, and includes solid phase and solution phase synthesis. For example, in solution an ordinary di-amine and an ordinary di-acid may be reacted to form a polymer, but the polymer would be of varying lengths and would not have a known number of entities. However, sequential synthesis could be conducted if either or both the di-amine or di-acid has one group protected such that reacting them together stops at one repeat unit because the protecting group or groups prevent(s) further reaction. The protecting group or groups may be removed and the resultant molecule reacted with a vast excess of either the di-amine or di-acid to attach another (exactly one more) repeat unit. At each stage in the synthesis, the resultant molecule may be purified of unreacted materials and side-products. A sequential synthesis may be convergent wherein two polymers are synthesized separately and then bound together. Alternatively to solution phase synthesis, the sequential synthesis can be carried out on a solid support for ease of purification and removal of excess reagents.

For example, polylysine can be prepared in any length via peptide synthesis and the epsilon amines derivatized with a chelating agent. Because the backbone is synthesized with protein chemistry, it can have other functionalities that may bind different elements.

Figure 4:
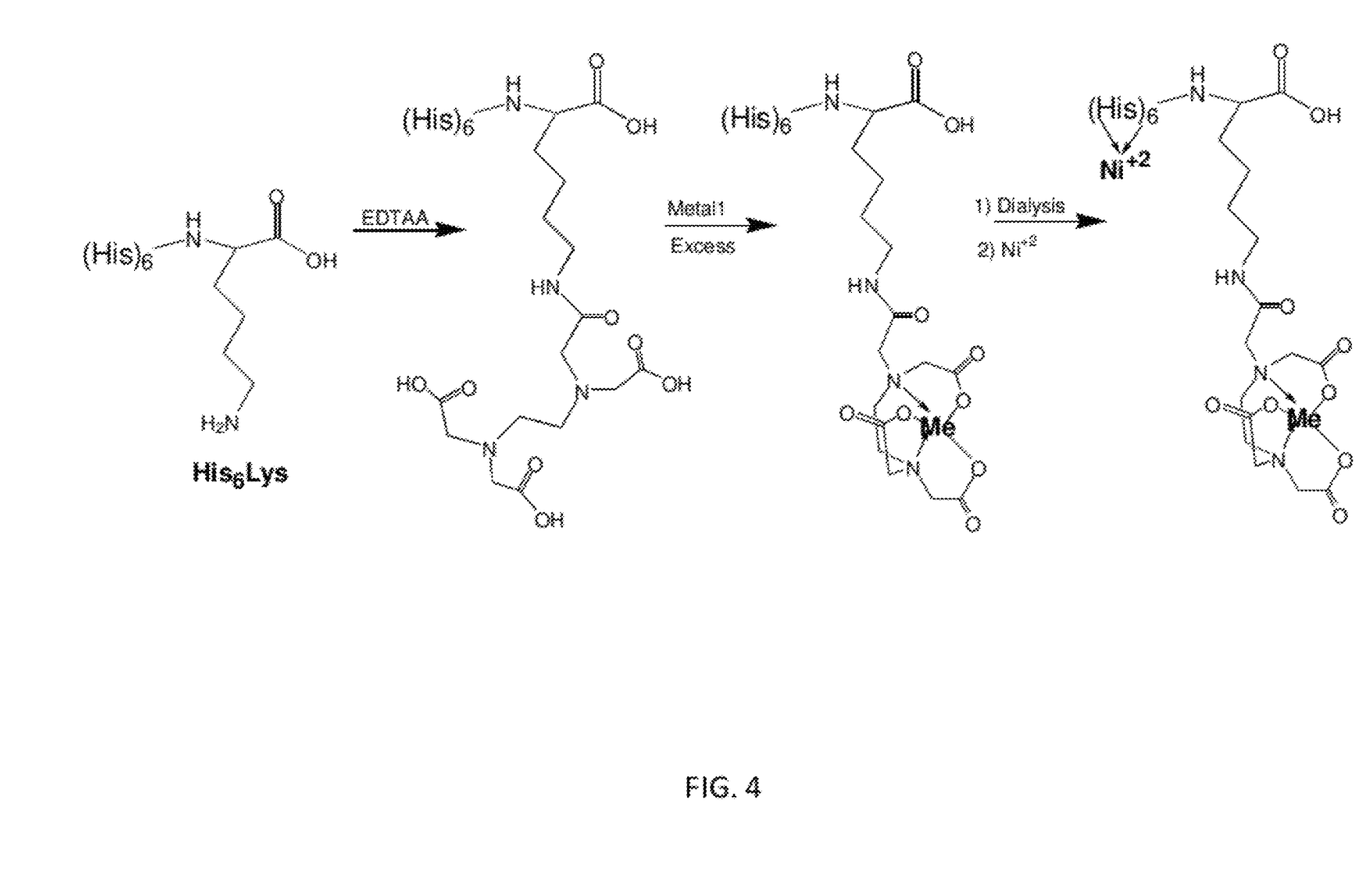
FIG. 4 shows a first method to incorporate two or more different atoms into a biomolecule used as the atomic metron, by use of a peptide with two distinct binding groups.

With sequential synthesis, one can incorporate different chelating agents that are each selective for various metals within a single metron, and thereby make nanoparticles of a defined, mixed composition. For example, Cys-Cys-polylysine is reactive for gold, and could be combined with His$_6$ to bind nickel FIG. 4 shows a first exemplary method to incorporate two or more different atoms into a biomolecule used as the atomic metron, by use of a peptide with two distinct binding groups. His$_6$ binds nickel well, but other metals poorly. A binding element is placed on the epsilon group of lysine using EDTA dianhydride (Aldrich cat #332046-EDTAA), as an example. The end terminus amine on the histidines will also be derivatized if it is not protected and thereby form another binding site for Metal-1. The derivatized biomolecule has the EDTA-like binding groups filled first with Metal-1 and the excess removed. The histidines then are exposed to and bind nickel.

Figure 5:
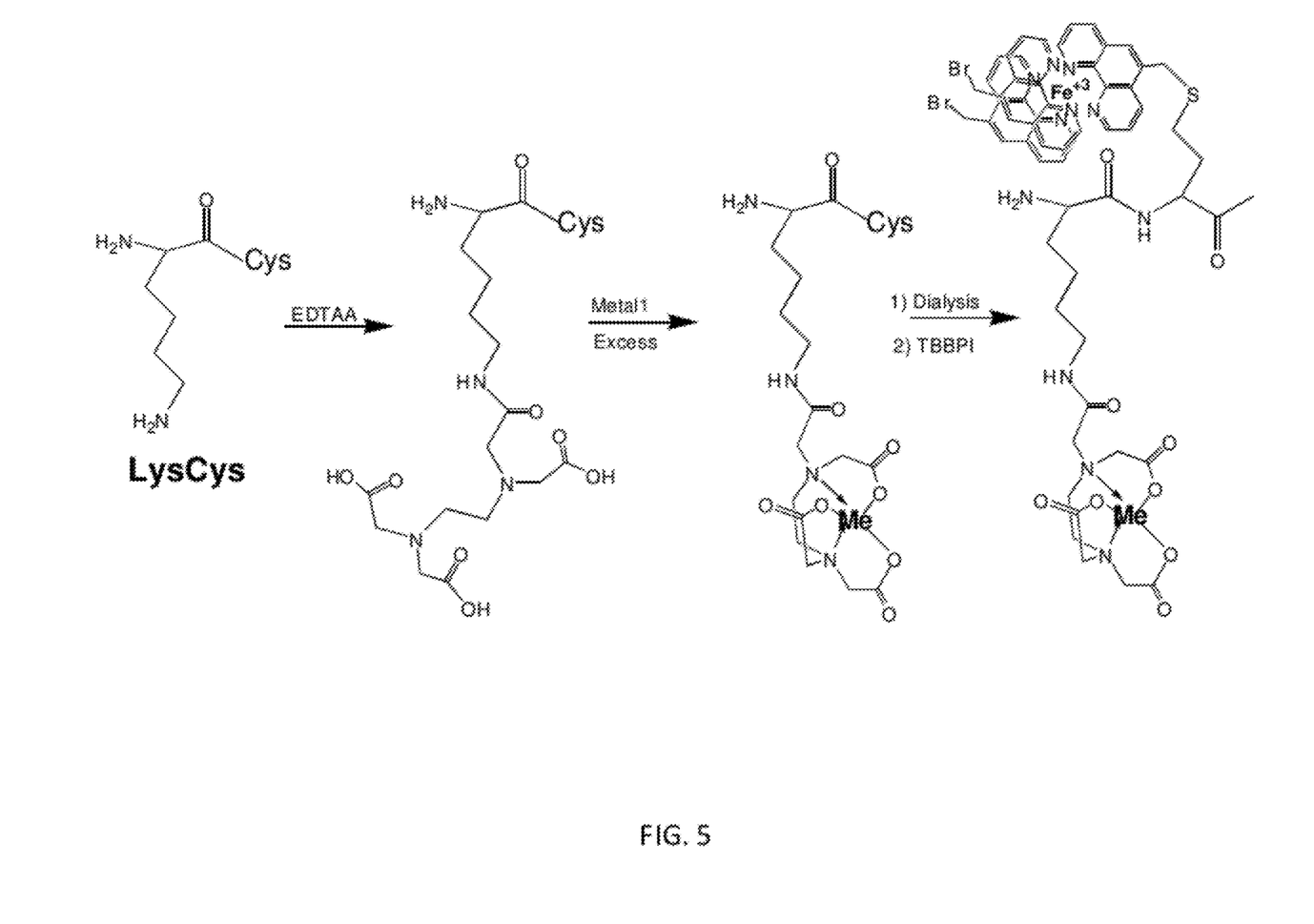
FIG. 5 shows a second method to incorporate two or more different atoms into a biomolecule used as the atomic metron, by use of selective reactivity of thiols to perform a $S_N2$ or Michael reaction on a thiol-reactive organo-metallic species.

FIG. 5 shows another technique using the selective reactivity of thiols to perform a Sn$_2$ or Michael reaction on a thiol-reactive organo-metallic species of Metal-1. In this example, the hypothetical metal chelate—tris-(5-bromomethyl 1,10-phenanthroline) iron is used as an example. Then the remaining EDTA-like binding groups are filled with Metal-2. More elements can be added with other selective chemistry or during the synthesis of the peptide carrier (essentially, organo-metallics are "stitched" together as one might make peptides).

Figure 6:
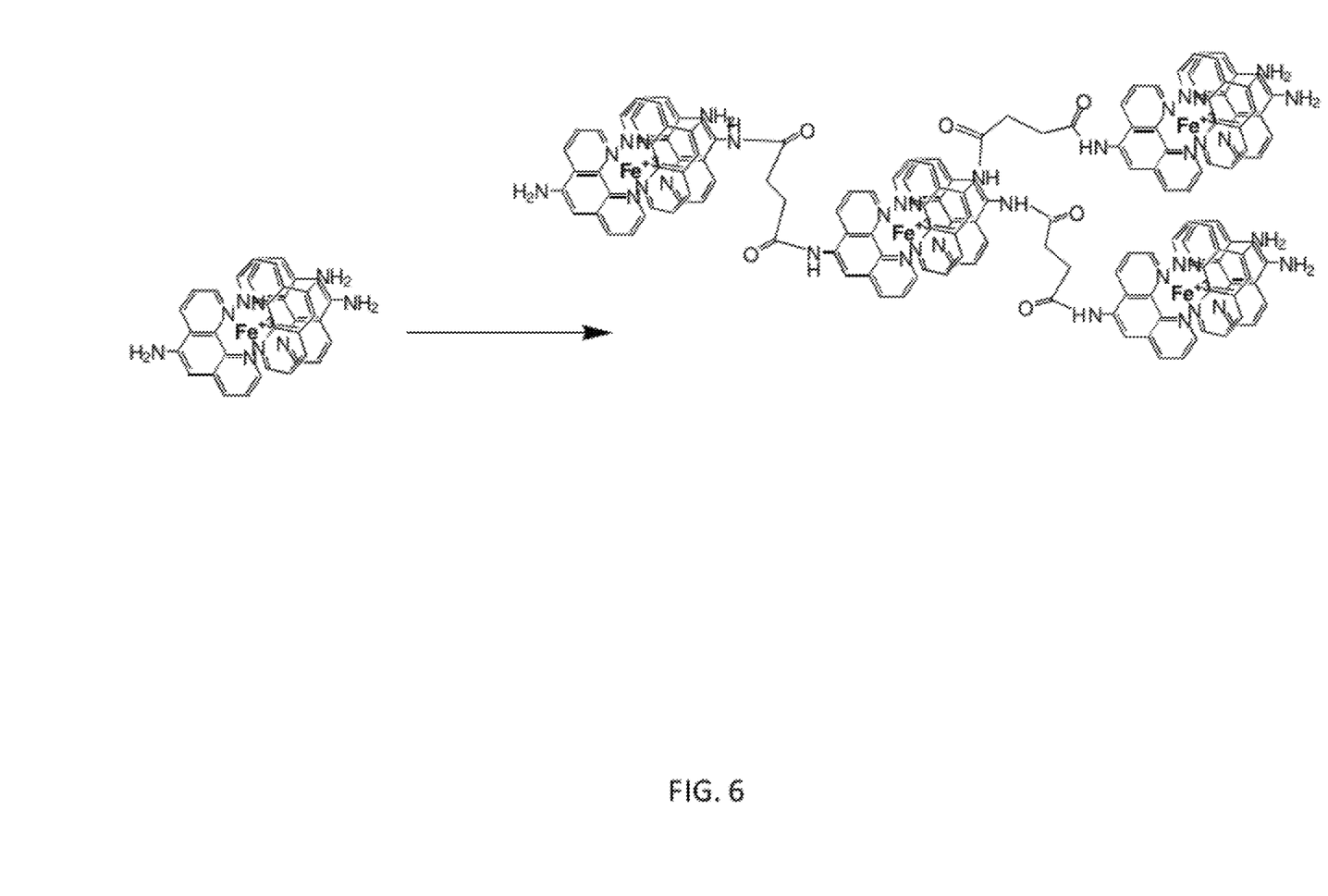
FIG. 6 shows a third method to incorporate two or more different atoms into a biomolecule used as the atomic metron, by use of organo-metallics where the chelate has a free amine.

Another technique, seen in FIG. 6, makes use of organo-metallics where the chelate has a free amine. In the example, the hypothetical metal chelate—tris-(5-amino 1,10-phenanthroline) iron is used. Succinic anhydride is reacted with the "Generation 0" molecule (depicted on the left of FIG. 6) and a coupling agent to create the Generation 1 molecule (depicted on the right). For this chelate, each generation beyond zero adds two times as many iron atoms as added in the previous generation such that Generation 5 would have 94 iron atoms present (1+3+6+12+24+48).

One can also incorporate the elements into the peptide before synthesis. For example, selenocysteine could be used. However, synthesis of III-V atomically-defined nanoparticles may be challenging because of the need to eliminate the atomic bucket in a clean manner where the formation of oxides would be a concern.

CONCLUSIONS

Potential uses of this technology include manufacturing standards of predefined molecular weight or size, or high-activity catalysts for specific reactions, or defined-size nanoparticles for electronic applications.

Each and every document mentioned throughout this text is hereby incorporated by reference in its entirety.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

What is claimed is:

1. A method of preparing atomically defined nanoparticles, the method comprising:
   (a) providing metrons having between 2 and 1000 high affinity binding sites having a $K_d > 10^{10}$,
   (b) filling the metrons with metal ions to obtain filled metrons,
   (c) removing excess metal ions,
   (d) spatially isolating the filled metrons, and
   (e) converting the metal ions to obtain atomically defined nanoparticles.

2. The method of claim 1, wherein said spatial isolating comprises forming a dilute solution.

3. The method of claim 1, wherein said spatial isolating comprises encapsulation of said metrons in an isolation matrix.

4. The method of claim 1, wherein said converting the metal ions comprises removing said filled metrons by heat and/or combustion.

5. The method of claim 1, further comprising reusing empty metrons that have been emptied of metal ions.

6. The method of claim 1, further comprising preparing said metrons by sequential synthesis.

7. The method of claim 6,
   wherein a first metal ion is included during said sequential synthesis, thereby obtaining a metron comprising the metal and one or more empty binding sites, and
   wherein said filling the metron comprises filing with a second metal ion,
   thereby obtaining a nanoparticle comprising two different metals.

8. The method of claim 1, wherein said atomically defined nanoparticles comprise at least two different metals.

9. The method of claim 1, further comprising binding together at least two filled metrons to form larger metrons, wherein said spatially isolating comprises isolating the larger metrons.

10. The method of claim 9, wherein said atomically defined nanoparticles comprise at least two different metals.

11. The method of claim 1, wherein said obtain atomically defined nanoparticles are at least 95% pure.

12. The method of claim 1, wherein said filled metrons comprise clusters of metal atoms.

13. A method of preparing a metron, the method comprising sequential synthesis to obtain a metron configured to contain a particular number of metal atoms between 2 and 1000 and having that particular number of high affinity binding sites having a $K_d > 10^{10}$.

14. The method of claim 13, wherein said sequential synthesis comprises sequential synthesis of EDTA or DTPA anhydride or derivatives thereof.

15. The method of claim 13, wherein said sequential synthesis incorporates two distinct metal-binding groups.

16. The method of claim 13, wherein said sequential synthesis comprises sequential synthesis of poly-lysine.

17. The method of claim 13, wherein said sequential synthesis incorporates at least one metal into said metron.

18. The method of claim 13, wherein multiple metrons are obtained, further comprising:
   (a) filling the metrons with metal ions to obtain filled metrons,
   (b) removing excess metal ions,
   (c) spatially isolating the filled metrons, and
   (d) converting the metal ions to obtain atomically defined nanoparticles.

* * * * *